(12) United States Patent
Rinklake (10) Patent No.: US 8,813,914 B2
(45) Date of Patent: Aug. 26, 2014

(54) CENTRIFUGAL CLUTCH AND GEARLESS ABSEIL DEVICE

(75) Inventor: Kai Rinklake, Neuwied (DE)

(73) Assignee: Skylotec GmbH, Neuwied (DE)

( * ) Notice: Subject to any disclaimer, the term of this patent is extended or adjusted under 35 U.S.C. 154(b) by 241 days.

(21) Appl. No.: 13/265,151

(22) PCT Filed: Mar. 30, 2010

(86) PCT No.: PCT/EP2010/002027
§ 371 (c)(1),
(2), (4) Date: Nov. 14, 2011

(87) PCT Pub. No.: WO2010/121699
PCT Pub. Date: Oct. 28, 2010

(65) Prior Publication Data
US 2012/0048651 A1  Mar. 1, 2012

(30) Foreign Application Priority Data

Apr. 21, 2009 (DE) .................... 20 2009 005 925 U (51) Int. Cl.
*B60T 8/72* (2006.01)
*A62B 1/10* (2006.01)

(52) U.S. Cl.
USPC ........................................................ 182/234

(58) Field of Classification Search
USPC ................................... 182/234; 192/105 BA
See application file for complete search history.

(56) References Cited

U.S. PATENT DOCUMENTS

| 3,026,980 | A * | 3/1962 | Hoff ..................... 192/105 BA |
| 3,946,989 | A * | 3/1976 | Tsuda ........................... 182/241 |
| 4,254,854 | A * | 3/1981 | St. John ................. 192/105 CD |
| 5,083,633 | A * | 1/1992 | Seeger ......................... 182/233 |
| 7,097,005 | B2 * | 8/2006 | Angermann .............. 188/181 A |
| 2008/0142296 | A1 * | 6/2008 | Jean .................................. 182/5 |

FOREIGN PATENT DOCUMENTS

| DE | 1103691 B | 3/1961 |
| DE | 2326041 A1 | 11/1973 |
| DE | 3338776 C1 | 3/1985 |

* cited by examiner

*Primary Examiner* — Alvin Chin-Shue
(74) *Attorney, Agent, or Firm* — Robert Curcio; DeLio, Peterson & Curcio, LLC (57) ABSTRACT

A centrifugal clutch having a rotor and a clutch component, with at least one centrifugal weight movable in the radial direction relative to the rotor. When the rotational speed of the rotor is below a predefined value, the centrifugal weight is arranged in a first position and at a distance from the clutch component so that the rotor can freely rotate relative to the clutch component and, when the rotational speed of the rotor is above the predefined value, the centrifugal weight executes a radial movement relative to the rotor under a centripetal force into a second position so that the centrifugal weight bears against a clutch wall of the clutch component and establishes a mechanical force fit between the rotor and the clutch component.

13 Claims, 9 Drawing Sheets

CENTRIFUGAL CLUTCH AND GEARLESS ABSEIL DEVICE

This application is a National Stage filing based on PCT/EP2010/002027 filed Mar. 30, 2010, and which claims priority to German Patent Application No. DE 20 2009 005 925.1, filed Apr. 21, 2009.

BACKGROUND OF THE INVENTION

Field of the Invention

The present invention relates to a centrifugal clutch having a rotor and having a clutch component, wherein at least one centrifugal weight, in particular two centrifugal weights, are arranged on the rotor so as to be movable relative to the rotor in a radial direction, and are designed, such that below a predetermined rotational speed of the rotor, the centrifugal weight is arranged spaced apart from the clutch component on the rotor in a first position such that the rotor is freely rotatable relative to the clutch component, and above the predetermined rotational speed of the rotor, the centrifugal weight performs a radial movement relative to the rotor under a centripetal force into a second position such that the centrifugal weight abuts against a clutch wall of the clutch component and produces mechanical non-positive engagement between the rotor and the clutch component.

The present invention also relates to an abseil device for a safety rope, having a shaft, having a first brake device, which is arranged on the shaft, for the safety rope, and having a second brake device which is arranged on the same shaft as the first brake device.

The present invention also relates to a fall arrester, in particular a climbing protection runner, which runs, in accompaniment with a person to be secured, on a movable or fixed guide which serves as a safety device, in particular a safety rail, climbing protection ladder, or safety rope, having a centrifugal clutch.

BRIEF SUMMARY OF THE INVENTION

It is the object of the invention to improve a centrifugal clutch and an abseil device and also a fall arrester having such a centrifugal clutch of the above-stated type with regard to functional reliability and holding force, and at the same time to optimize an installation space requirement.

The object is achieved according to the invention by means of a centrifugal clutch of the above-stated type, by means of an abseil device of the above-stated type, and by means of a fall arrester of the above-stated type. Advantageous refinements of the invention are described in the further claims.

The above and other objects, which will be apparent to those skilled in the art, are achieved in the present invention which is directed to a centrifugal clutch comprising: a rotor; a clutch component; at least one centrifugal weight arranged on the rotor so as to be movable relative to the rotor in a radial direction, and designed, such that below a predetermined rotational speed of the rotor, the centrifugal weight is spaced apart from the clutch component on the rotor in a first position such that the rotor is freely rotatable relative to the clutch component, and above the predetermined rotational speed of the rotor, the centrifugal weight performs a radial movement relative to the rotor under a centripetal force into a second position such that the centrifugal weight abuts against a clutch wall of the clutch component and produces mechanical non-positive engagement between the rotor and the clutch component, wherein the centrifugal weight is movable in the circumferential direction at least counter to the direction of rotation of the rotor, and a contact surface between the rotor and the centrifugal weight, proceeding from the first position, such that a spacing between the contact surface and the clutch wall of the clutch component decreases as viewed in the circumferential direction at least counter to the direction of rotation of the rotor.

The centrifugal clutch may have the centrifugal weight arranged on the rotor such that the movement in the circumferential direction is permitted only when the centrifugal weight reaches the second position.

The centrifugal clutch includes the contact surface having a design such that the spacing to the clutch wall decreases to a value smaller than a width of the centrifugal weight in the radial direction with respect to the rotor.

The centrifugal clutch of claim 1 may include the rotor being of oval cross section at its circumference in the region of the contact surface between the rotor and centrifugal weight, wherein the centrifugal weight, in the first position, abuts in a region of the oval contact surface in which the oval contact surface has the smallest cross section or the smallest cross-sectional length in the radial direction.

The centrifugal clutch may also include two centrifugal weights which, at a distance from the rotor and at both sides of the rotor, are connected to one another via two resiliently elastic elements such that the resiliently elastic elements force the centrifugal weights radially toward one another and press them against the contact surface on the rotor.

The centrifugal weight may comprise a ring segment, half-ring segment, D-shaped, or U-shaped design.

In a second aspect, the present invention is directed to an abseil device for a safety rope comprising: a shaft; a first brake device arranged on the shaft for the safety rope, and a second brake device arranged on the same shaft as the first brake device, the second brake device designed as a centrifugal clutch.

The first brake device may comprise a centrifugal clutch, an oil-hydraulic brake, or both.

The abseil device includes the rotor and the second brake device designed and arranged such that a frictional connection is provided between the safety rope and the rotor.

The abseil device may include a rope pulley having at least one driver which abuts against at least one centrifugal weight of the second brake device, such that positive engagement is produced between the centrifugal weight and the rope pulley.

In a third aspect, the present invention is directed to a fall arrester, which runs, in accompaniment with a person to be secured, on a movable or fixed guide which serves as a safety device, a safety rail, climbing protection ladder, or safety rope, having a centrifugal clutch.

BRIEF DESCRIPTION OF THE DRAWINGS

The invention will be explained in more detail herein below with reference to the drawing, in which.

DETAILED DESCRIPTION OF THE INVENTION

In the case of a centrifugal clutch of the above-stated type, it is provided according to the invention that the centrifugal weight is arranged on the rotor so as to additionally be movable in the circumferential direction at least counter to the direction of rotation of the rotor, wherein a contact surface between the rotor and the centrifugal weight is designed such that, proceeding from the first position, a spacing between the contact surface and the clutch wall of the clutch component decreases as viewed in the circumferential direction at least counter to the direction of rotation of the rotor.

This has the advantage that the mechanical non-positive engagement between the rotor and the clutch component is boosted beyond the frictional engagement by the centripetal force acting on the centrifugal weight. In this way, using a geometrically small centrifugal clutch with a small installation space requirement, it is possible to transmit high forces between the rotor and the clutch component, or to obtain an effective non-positive connection, even at low values for the predetermined rotational speed of the rotor.

It is provided that boosting of the force of the non-positive engagement between the rotor and clutch component takes place only when the centrifugal weight actually abuts against the wall of the clutch component, by virtue of the centrifugal weight being arranged on the rotor such that the movement in the circumferential direction is permitted only when the centrifugal weight reaches the second position.

It is provided that the clamping non-positive engagement is maintained solely by a load torque acting on the rotor even when the rotor is at a standstill after having exceeded the predetermined rotational speed, by virtue of the contact surface being designed such that the spacing to the clutch wall decreases to a value smaller than a width of the centrifugal weight in the radial direction with respect to the rotor.

In a preferred embodiment, the rotor is of oval cross section at its circumference in the region of the contact surface between the rotor and centrifugal weight, wherein the centrifugal weight is arranged such that, in the first position, it abuts in a region of the oval contact surface in which the oval contact surface has the smallest cross section in the radial direction. In this way, a relative movement between the centrifugal weight and the rotor has the effect that the centrifugal weight is moved on the oval contact surface in the circumferential direction from a minimum cross section of the oval contact surface toward a maximum cross section. The function is independent of the direction of rotation of the rotor.

A mechanically particularly simple and at the same time functionally reliable embodiment is obtained by virtue of two centrifugal weights being provided which, at a distance from the rotor and at both sides of the rotor, are connected to one another via two resiliently elastic elements such that the resiliently elastic elements force the centrifugal weights radially toward one another and press them against the contact surface on the rotor.

In a particularly preferred embodiment, the centrifugal weights form between them, as viewed in cross section, an oval opening which engages around the oval contact surface of the rotor.

In an exemplary embodiment, the centrifugal weight is designed as a ring segment, in particular half-ring segment, or is of D-shaped or U-shaped design. Here, recesses for receiving the spring element are optionally formed on free ends of the centrifugal weight.

In a preferred embodiment, the clutch wall of the clutch component radially surrounds the rotor.

In an abseil device of the above-stated type, it is provided according to the invention that the second brake device is designed as a centrifugal clutch as described above.

This has the advantage that a gearing-free abseil device is provided which, while having a small installation space requirement, provides a high braking action even at low rotational speeds of the rotor.

In a preferred embodiment, the first brake device comprises a centrifugal clutch and/or an oil-hydraulic brake.

The clutch component expediently comprises a housing, wherein the clutch wall is formed in the housing.

A particularly good braking action is obtained by virtue of the first brake device and the second brake device being connected to one another in a rotationally conjoint manner.

A particularly compact design is obtained by virtue of the first brake device and the second brake device being arranged jointly on the rotor. The rotor is preferably arranged on the shaft so as to be rotatable with respect to the shaft. Here, to transmit the rotational movement to the rotor, the rotor and the second brake device is designed and arranged such that a frictional connection is provided between the safety rope and the rotor. In a particularly preferred embodiment, the rotor has a cover which is connected thereto in a rotationally conjoint manner and which is arranged axially between the first and the second brake device such that the at least one centrifugal weight of the second brake device produces a frictional connection to the cover.

It is provided that the one or more centrifugal weight(s) of the second brake device are directly rotated by means of a rope pulley, by virtue of a rope pulley being provided for the safety rope, which rope pulley has at least one, in particular two drivers which abut against at least one centrifugal weight of the second brake device, such that positive engagement is produced between the centrifugal weight and the rope pulley. Two drivers are expediently provided which engage axially into intermediate spaces between two centrifugal weights of the second brake device.

A particularly simple construction is obtained by virtue of the at least one driver being formed in one piece with the rope pulley.

In a fall arrester of the above-stated type, it is provided according to the invention that the centrifugal clutch is designed as described above.

This has the advantage that a fall arrester is provided which has small dimensions while simultaneously having a highly effective fall arresting mechanism.

Figure 1:
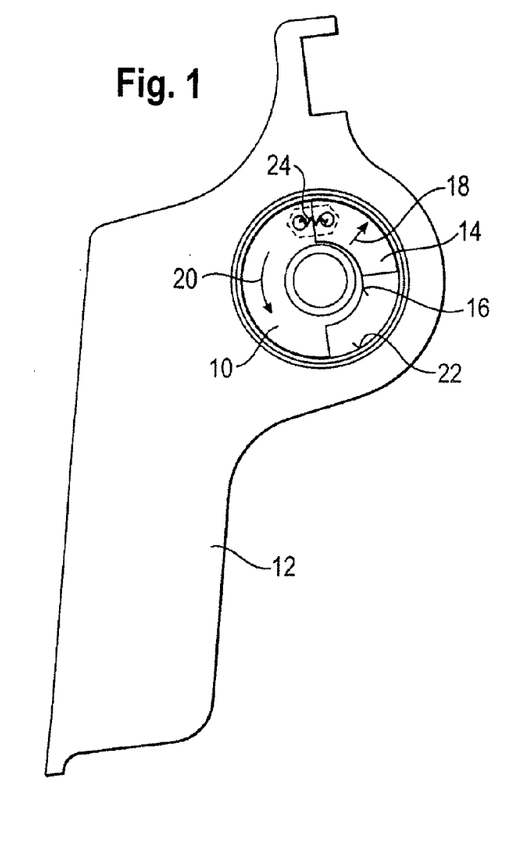
FIG. 1 shows a side view of a first preferred embodiment of a centrifugal clutch according to the invention in a first position.
Figure 2:
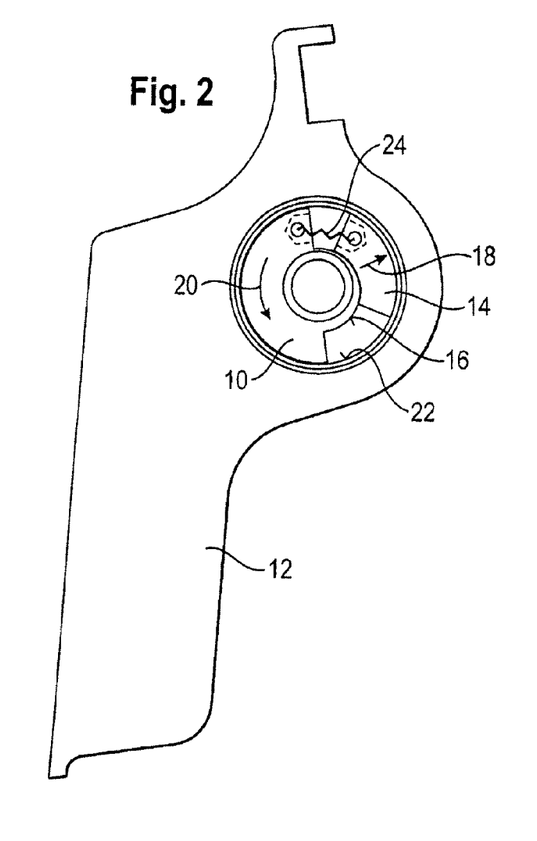
FIG. 2 shows the first preferred embodiment of a centrifugal clutch according to FIG. 1 in a second position.
Figure 3:
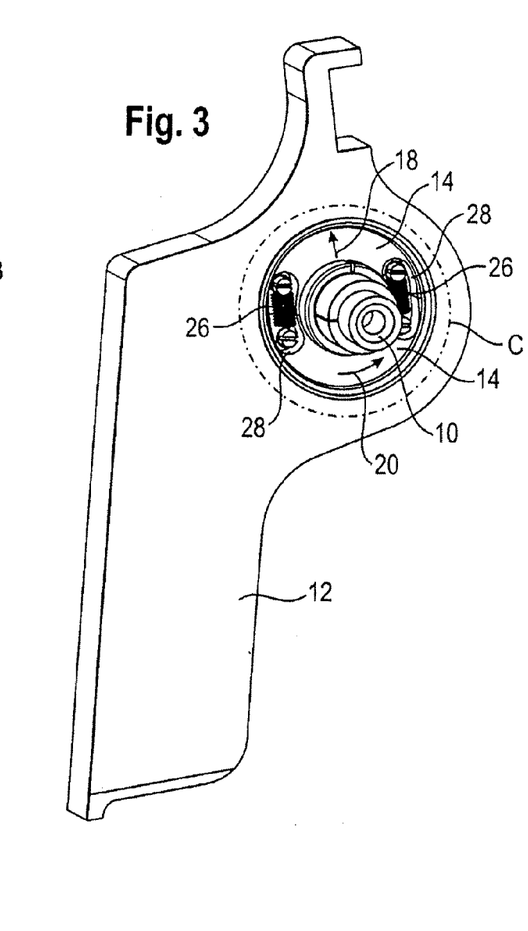
FIG. 3 shows a second preferred embodiment of a centrifugal clutch according to the invention in a perspective view.
Figure 4:
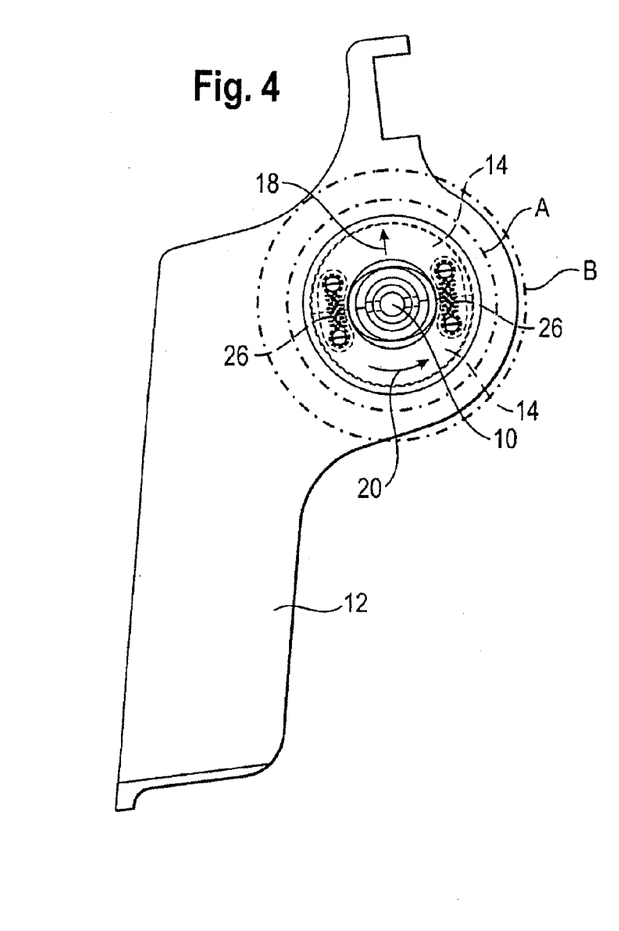
FIG. 4 shows the second preferred embodiment of a centrifugal clutch according to FIG. 3 in a side view.

The first preferred embodiment of a centrifugal clutch according to the invention, illustrated in FIGS. 1 and 2, comprises a rotor 10, a clutch component 12 and a centrifugal weight 14 which rests on a contact surface 16 of the rotor 10. The centrifugal weight 14 is arranged on the rotor 10 such that the centrifugal weight 14 is movable relative to the rotor 10 outward in the radial direction 18 and is movable in the circumferential direction in the opposite direction to the direction of rotation 20 of the rotor 10. The clutch component 12 surrounds the rotor 10 radially at the outside and in the circumferential direction by means of a clutch wall 22. In FIG. 1, the centrifugal weight 14 is in a first position in which it is spaced apart from the clutch wall 22 of the clutch component 12, such that the rotor 10 can rotate freely within the clutch component 12.

The centrifugal weight 14 is mechanically connected to the rotor 10 via a resiliently elastic component 24 such that the resiliently elastic component 24 loads the centrifugal weight 14 relative to the rotor 10 with a preload force which pulls the centrifugal weight 14 in the direction of the first position according to FIG. 1.

As the rotational speed of the rotor 10 increases, an increasing centripetal force in the radial direction 18 acts on the centrifugal weight 14. This leads to a relative movement of the centrifugal weight 14 in the radial direction 18 counter to a corresponding restoring force of the resiliently elastic component 24 in the direction of the first position. As a result, the centrifugal weight 14 abuts mechanically against the clutch wall 22 of the clutch component 12, which leads to corresponding friction between the centrifugal weight 14 and clutch wall 22. Said friction generates a force on the centrifugal weight 14 counter to the direction of rotation 20 of the rotor 10. On account of the movable arrangement of the centrifugal weight 14 relative to the rotor 10, the centrifugal weight 14 moves in the circumferential direction counter to the direction of rotation 20 of the rotor 10 and in so doing slides along the contact surface 16 on the rotor 10. The higher the rotational speed of the rotor 10, the more intensely the centrifugal weight 14 is pressed radially against the clutch wall 22 of the clutch component 12, and the greater the resulting friction force is which pushes the centrifugal weight 14 along the contact surface 16 on the rotor 10 counter to the direction of rotation 20 of the rotor 10 in the circumferential direction.

According to the invention, the contact surface 16 on the rotor 10 is designed such that a radial spacing between the clutch wall 22 and the contact surface 16 decreases in the circumferential direction counter to the direction of rotation 20 of the rotor 10. In this way, the contact surface assists in pressing the centrifugal weight 14 radially against the clutch wall 22 with increasing deflection or movement of the centrifugal weight 14 in the circumferential direction counter to the direction of rotation 20 of the rotor 10. In this way, a mechanical non-positive engagement between the rotor 10 and the clutch component 12 is boosted beyond merely the centripetal force, such that intense non-positive engagement is obtained between the rotor 10 and the clutch component 12 even at relatively low rotational speeds of the rotor 10.

FIG. 2 illustrates a state of the centrifugal clutch at such a high rotational speed of the rotor 10 that the centrifugal weight 14 has been displaced relative to the rotor 10 in the radial direction, and additionally in the circumferential direction counter to the direction of rotation 20, into a second position. Here, with a correspondingly steep gradient of the contact surface 16 in the circumferential direction counter to the direction of rotation 20, the clamping action between the contact surface 16 and the clutch wall 22 can be so intense that, even when the rotor 10 is at a standstill, on account of the braking action of the centrifugal weight 14 abutting against the clutch surface 22, the non-positive engagement between the rotor 10 and clutch component 12 is maintained for as long as the rotor 10 is loaded with a torque in the direction of rotation. A release of load from the rotor 10 then has the result that the resiliently elastic component 24 eliminates the clamping hold of the centrifugal weight 14 between the contact surface 16 and the clutch wall 22 and moves the centrifugal weight back into the first position according to FIG. 1, and the rotor 10 is thereby released again, that is to say can rotate freely again relative to the clutch component 12.

FIGS. 3 to 12 show a second preferred embodiment of a centrifugal clutch according to the invention, wherein functionally identical parts are provided with the same reference numerals as in FIGS. 1 and 2, such that for an explanation of said parts, reference is made to the above description of FIGS. 1 and 2. In contrast to the first embodiment, two centrifugal weights 14 are provided which, at both sides of the rotor 10, are connected to one another via respective resiliently elastic components 26 such that said resiliently elastic components 26 load the two centrifugal weights 14 radially toward one another with a preload force, such that the centrifugal weights 14 abut mechanically against the contact surface 16 of the rotor 10 at opposite sides under the action of the resiliently elastic components 26. Here, in contrast to the first embodiment according to FIGS. 1 and 2, the rotor 10 is of oval cross section in the region of the contact surface 16, as can be seen in particular from FIGS. 10 and 11. Here, the centrifugal weights 14 and the resiliently elastic components 26 are arranged such that, in the first position of the centrifugal weights 14, these abut against the contact surface 16 in a circumferential region of the rotor 10 in which the rotor 10 has a minimum radial cross-sectional length or radius in the cross section of the oval or elliptical design. In other words, in the first position, the centrifugal weights 14 abut in the region of a minor axis of the ellipse defined in cross section by the contact surface 16.

Figure 5:
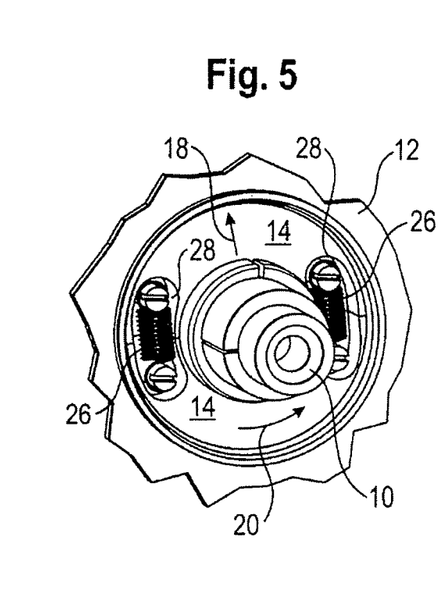
FIG. 5 shows a perspective detail view of the region C in FIG. 3 of the second preferred embodiment of a centrifugal clutch according to FIG. 3.
Figure 6:
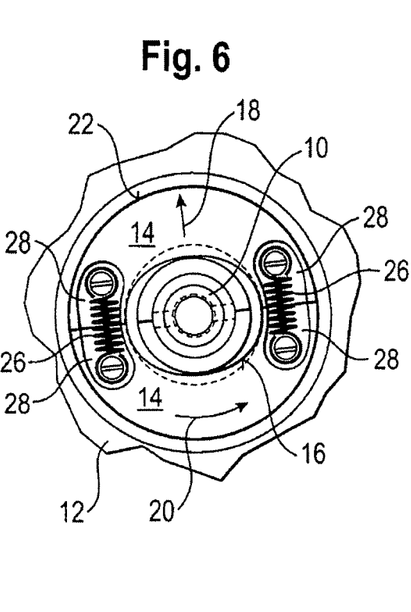
FIG. 6 shows a perspective detail view of the region A in FIG. 4 of the second preferred embodiment of a centrifugal clutch according to FIG. 4.
Figure 7:
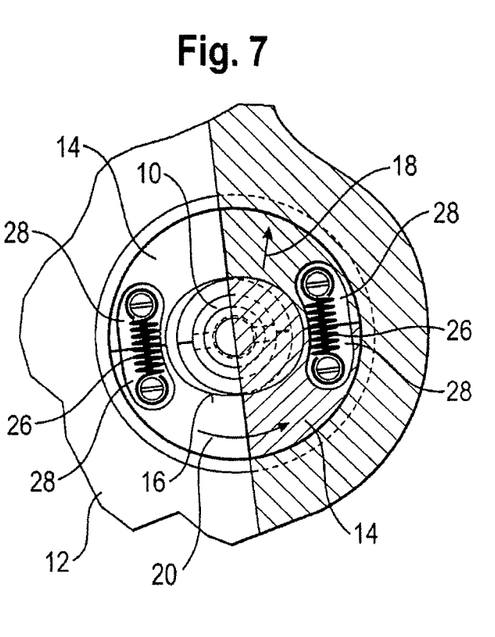
FIG. 7 shows a perspective, partially sectional detail view of the region B in FIG. 4 of the second preferred embodiment of a centrifugal clutch according to FIG. 4.
Figure 8:
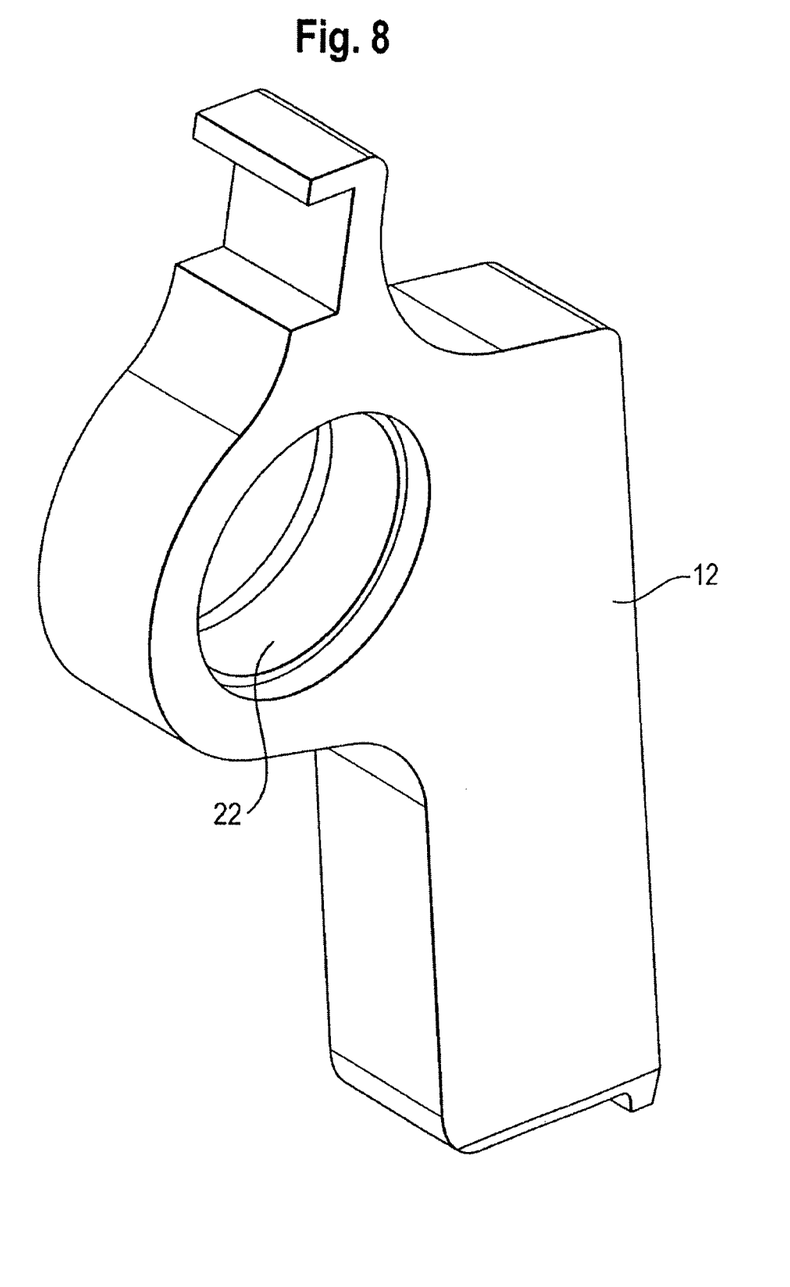
FIG. 8 shows a clutch component of the centrifugal clutch according to FIG. 3 in a perspective view.
Figure 9:
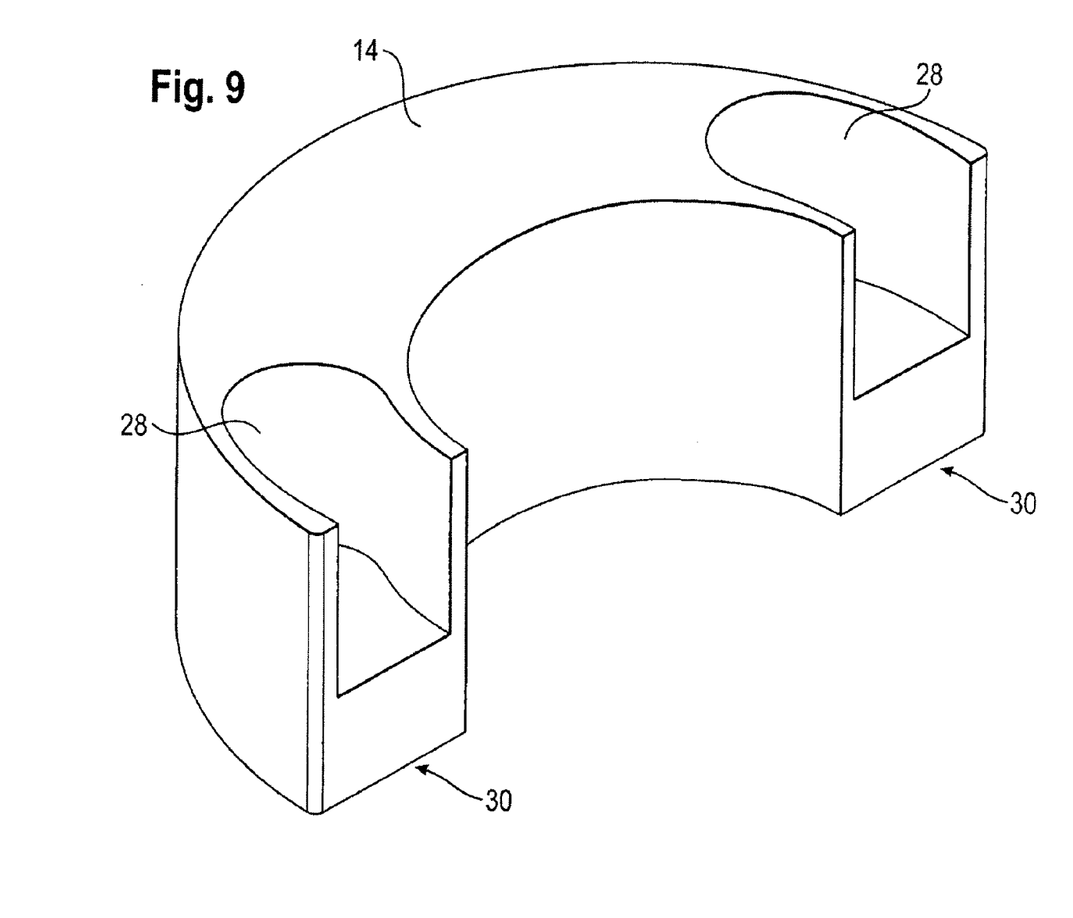
FIG. 9 shows a centrifugal weight of the centrifugal clutch according to FIG. 3 in a perspective view.

The two centrifugal weights 14 are of U-shaped design with free ends 30, as can be seen in particular from FIG. 9, wherein the free ends of the two U-shaped centrifugal weights 14 face toward one another, as can be seen in particular from FIGS. 5 to 7. Formed on the free ends 30 of the two U-shaped centrifugal weights 14 is in each case one recess 28 for receiving the resiliently elastic components 26, as can be seen in particular from FIGS. 6 and 9. The centrifugal weights 14 are arranged within the clutch housing 12 in a freely floating manner with respect to the rotor 10, such that said centrifugal weights can move in the circumferential direction with respect to the rotor 10. Here, the preload force of the resiliently elastic components 26, which pulls the centrifugal weights 14 toward one another in the radial direction with respect to the rotor 10, has the effect that, when the rotor 10 is stationary, the centrifugal weights 14 slide along the contact surface 16 of oval cross section until said centrifugal weights arrive at that point of the contact surface 16 which has the smallest radial cross-sectional length, because the point has the lowest potential energy for the spring-loaded system composed of centrifugal weights 14, resiliently elastic components 26 and contact surface 16.

As the rotational speed of the rotor 10 increases, the centrifugal weights 14 are moved out of the first position and outward in the radial direction 18 and away from one another counter to the restoring force of the resiliently elastic components 26, until the centrifugal weights 14 abut against the clutch wall 22 and produce a force-transmitting connection by means of friction between the rotor 10 and the clutch component 12. This leads to a corresponding braking force which acts on the centrifugal weights 14 in the circumferential direction counter to the direction of rotation 20 of the rotor 10. If the braking force becomes large enough to overcome the restoring force of the resiliently elastic components 26 in the circumferential direction into the first position illustrated in FIG. 4, the braking force leads to a movement of the centrifugal weights 14 in the circumferential direction counter to the direction of rotation 20 of the rotor 10, and the centrifugal weights 14 slide along the oval contact surface 16 away from the first position. As a result, owing to the oval design of the contact surface 16, the centrifugal weights 14 are additionally pressed against the clutch wall 22, because a radial spacing between the contact surface 16 and the clutch wall 22 decreases as viewed in the circumferential direction proceeding from the first position. This intensifies the non-positive engagement between the rotor 10 and the clutch component 12 beyond the friction force alone on account of the centripetal force acting on the centrifugal weights 14, such that high forces can be transmitted between the rotor 10 and the clutch component 12 even at low rotational speeds.

The oval design of the contact surface 16 on the rotor 10 is preferably such that a radial spacing between the contact surface 16 and the clutch wall 22 at a point of greatest radial diameter of the rotor 10 is smaller than a radial dimension of one of the centrifugal weights 14. In this way, spinning of the rotor 10 relative to the centrifugal weights 14 is prevented, or in other words, the movement of the centrifugal weights 14 relative to the rotor 10 in the circumferential direction is limited to a predetermined angle range, wherein said angle range is for example less than or equal to 90 degrees.

Figure 10:
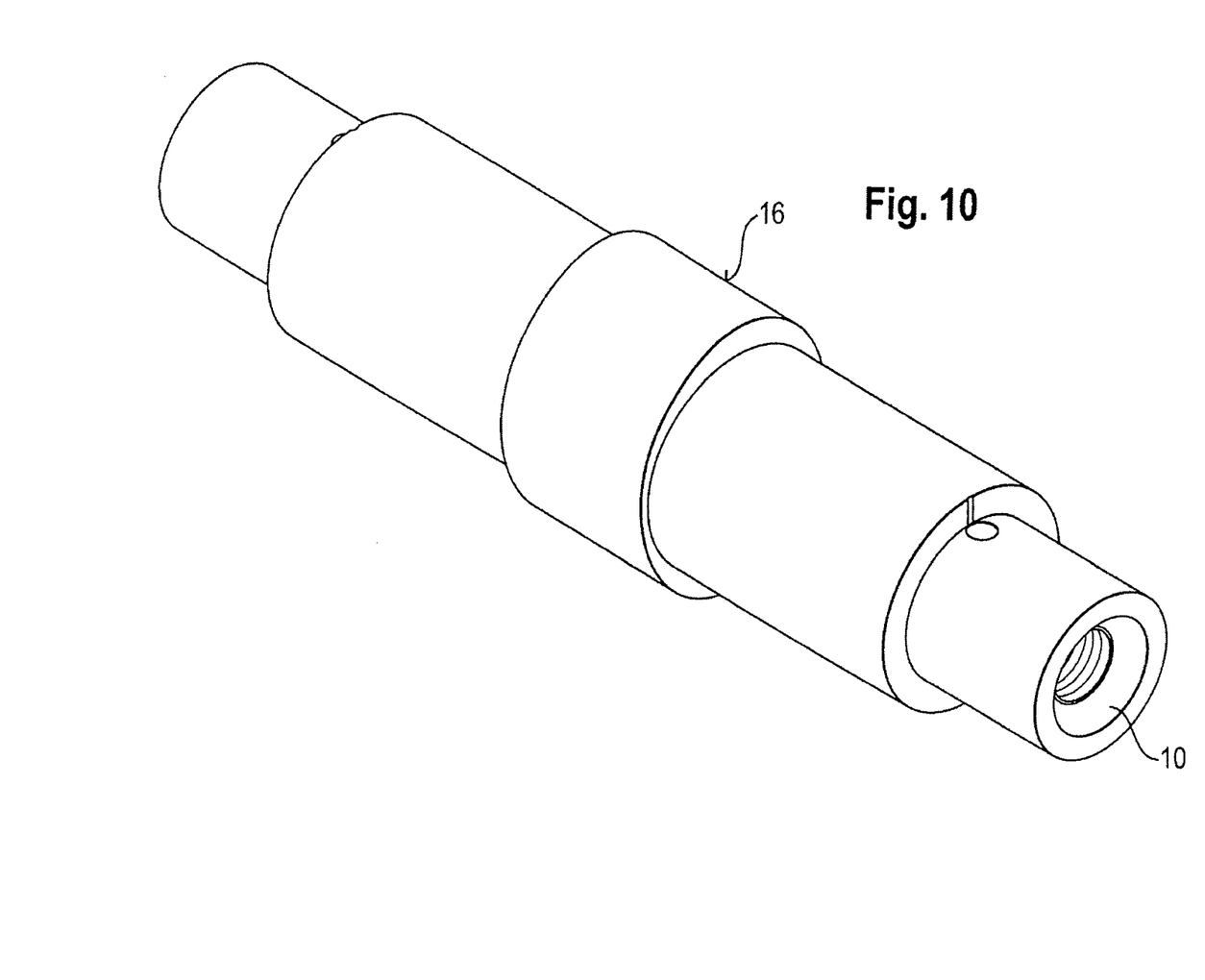
FIG. 10 shows a rotor of the centrifugal clutch according to FIG. 3 in a perspective view.
Figure 11:
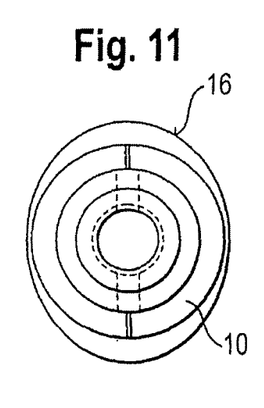
FIG. 11 shows the rotor according to FIG. 10 in a side view in the direction of a longitudinal axis of the rotor.
Figure 12:
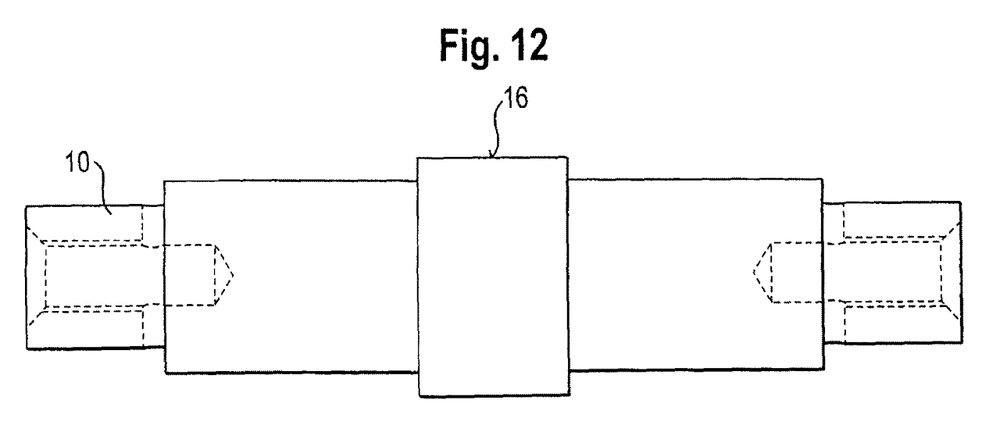
FIG. 12 shows the rotor according to FIG. 10 in a side view in the direction perpendicular to a longitudinal axis of the rotor.

It can be seen from FIGS. 10 and 12 that the contact surface 16 is formed only over a limited region of the rotor 10 in the axial direction. Also, the rotor 10 is of oval or elliptical cross section at its outer circumference only in said region with the contact surface 16.

Even though a particular preferred direction for the direction of rotation 20 of the rotor 10 is illustrated in the two above-described embodiments for a centrifugal clutch according to the invention as per FIGS. 1 to 12, this is not intended to signify a restriction to centrifugal clutches having only one direction of rotation 20 of the rotor 10. In fact, the rotor 10 may rotate optionally in one or the other direction. The movement of the one or more centrifugal weights 14 in the circumferential direction relative to the rotor 10 however always opposes the direction of rotation 20 of the rotor 10.

Figure 13:
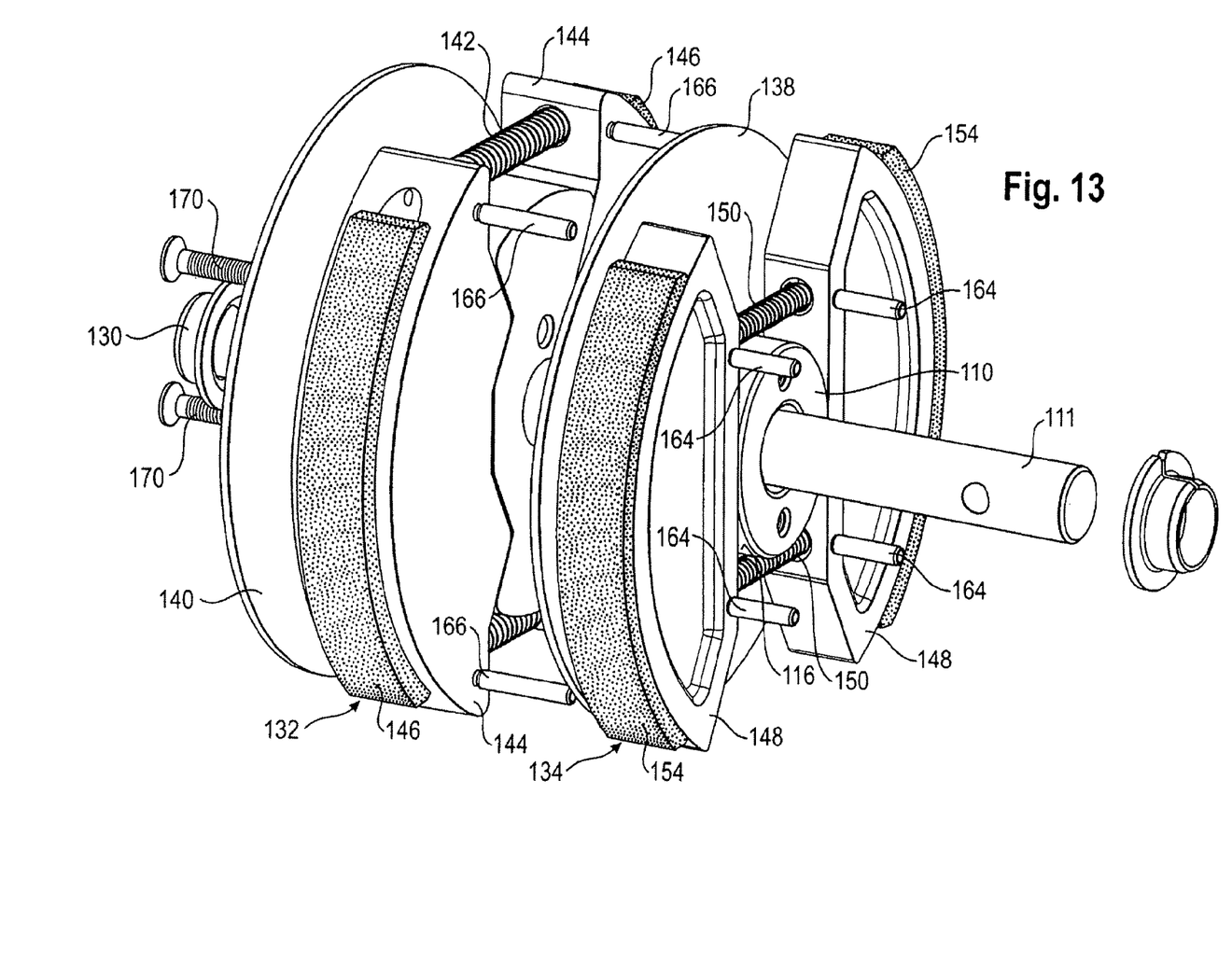
FIG. 13 shows a preferred embodiment of an abseil device according to the invention in a perspective exploded illustration.

The preferred embodiment of an abseil device according to the invention illustrated in FIG. 13 comprises a shaft 111. Arranged on the shaft 111 is a collar bush 130, a first centrifugal clutch 132 and a second centrifugal clutch 134. A housing (not illustrated) forms a clutch wall which is arranged around the first and second centrifugal clutches 132 and 134, similarly to the clutch wall 22 of the first and second embodiments.

The first centrifugal clutch 132 is provided with in each case one cover 138 and 140 axially at each side. The first centrifugal clutch 132 comprises first tensile springs 142 which force two first centrifugal weights 144 radially together, or inward away from the clutch wall. Each first centrifugal weight 144 has, on that side thereof which faces toward the clutch wall, a first brake lining 146 which, during a radial movement of the first centrifugal weight 144 outward on account of a centripetal force, abuts mechanically against the clutch wall and produces a frictional connection.

Figure 14:
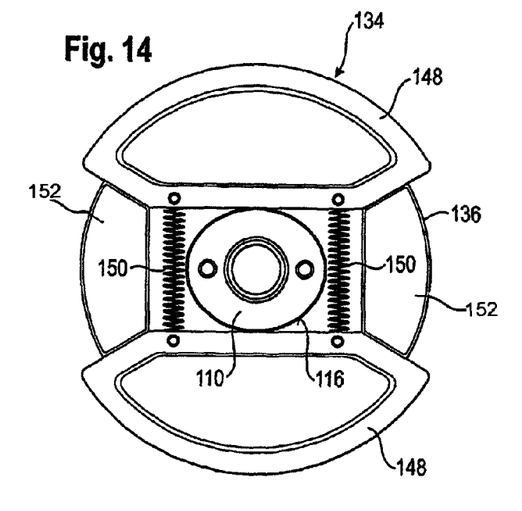
FIG. 14 shows a centrifugal clutch of the abseil device according to FIG. 13 in a plan view.
Figure 15:
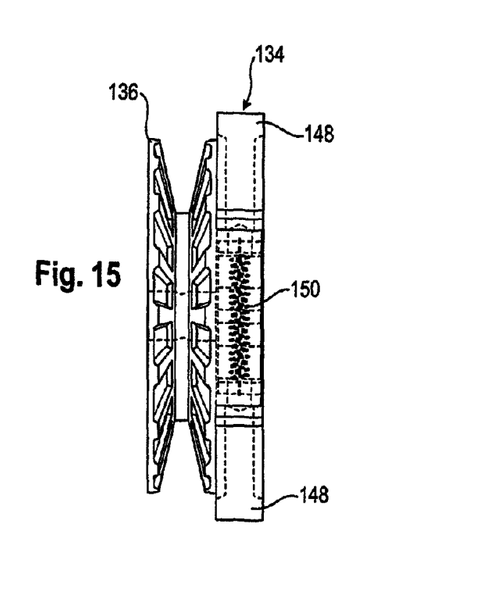
FIG. 15 shows the centrifugal clutch according to FIG. 14 in a side view.
Figure 16:
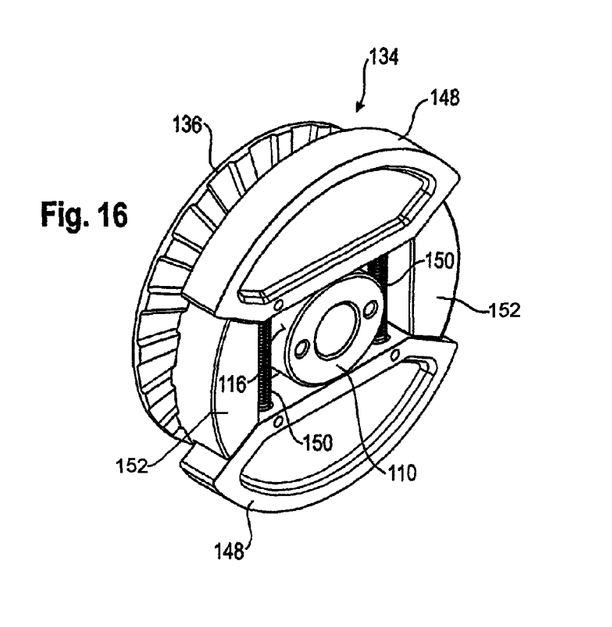
FIG. 16 shows the centrifugal clutch according to FIG. 14 in a perspective view.

As can also be seen from FIGS. 14 to 16, the second centrifugal clutch 134 has two second centrifugal weights 148 which are pulled radially together, and against a contact surface 116 on a rotor 110, by two second tensile springs 150. Similarly to the second embodiment of a centrifugal clutch as per FIGS. 3 to 12, the second centrifugal weights 148 are mounted so as to be movable in the circumferential direction relative to the rotor 110, wherein the contact surface 116, similarly to the contact surface 16, is of oval or elliptical cross section. The second centrifugal clutch 134 therefore corresponds in terms of its function to the second embodiment of a centrifugal clutch as per FIGS. 3 to 12, such that for an explanation of the function, reference is made to the above description of FIGS. 3 to 12. In said second centrifugal clutch 134, too, a movement of the second centrifugal weights 148 in the circumferential direction counter to the direction of rotation of the rotor 110 accordingly leads to an intensification of the force with which the second centrifugal weights 148 are pressed against the clutch wall. In contrast to the centrifugal weights 14 of the second embodiment of a centrifugal clutch as per FIGS. 3 to 12, the second centrifugal weights 148 are not of U-shaped design but rather are of D-shaped design. Arranged on respective sides, which face toward the clutch wall, of the second centrifugal weights 148 are second brake linings 154 which, in the event of an outward radial movement of the second centrifugal weights 148 on account of a centripetal force, mechanically abut against the clutch wall and produce a frictional connection. The rotor 110 is arranged in a rotatable manner on the shaft 111. Merely by way of example, FIGS. 14 to 16 also illustrate a rope pulley 136, which is arranged on the second centrifugal clutch 134, for a safety rope (not illustrated).

The first centrifugal clutch 132 is likewise arranged on the rotor 110 and therefore so as to be rotatable with respect to the shaft 111 and rotationally conjoint with respect to the second centrifugal clutch 134. The covers 138 and 140 are connected to the rotor 110 in a rotationally conjoint manner. As a result of friction between the second centrifugal weights 148 and the cover 138, the rotational movement is also transmitted to the rotor 110 and therefore to the first centrifugal clutch 132. In the region of the first centrifugal clutch 132, the rotor 110 is of toothed design, and the first centrifugal weights 144 are of matching toothed design thereto on their side facing toward the rotor 110, such that the first centrifugal weights 144 and the rotor 110 are connected to one another in a positively locking and therefore substantially rotationally conjoint manner.

Similarly to the second embodiment of a centrifugal clutch as per FIGS. 3 to 12, the second centrifugal weights 148 can move in the circumferential direction relative to the rotor 110, and thereby slide along the oval contact surface 116. Similarly to the second embodiment of a centrifugal clutch as per FIGS. 3 to 12, the oval design of the contact surface 116 results in a decrease in the radial spacing between the clutch wall and the contact surface 116 as viewed in the circumferential direction proceeding from the first position of the second centrifugal weights 148. As a result of the symmetry of the oval design of the contact surface 116, the function of the friction or brake force boosting by the movement of the second centrifugal weights 148 in the circumferential direction is independent of the direction of rotation of the rotor 110 or of the shaft 111 or of a safety rope which is connected to the shaft 111 in a rotational manner by corresponding means, for example directly or via a gearing.

The second centrifugal weights 148 are mounted on the rotor 110 preferably by roller bearings, such that the brake runs freely and does not stick. A plain bearing arrangement is however also possible. The second centrifugal weights 148 depart from the first position illustrated in FIGS. 13 to 16 owing to the centripetal force acting on them when the shaft 111 rotates quickly enough. The resulting braking action owing to the friction between the second brake linings 154 and the clutch wall is on a corresponding safety rope.

A movement of the safety rope leads to a rotation of the shaft 111 when a person to be abseiled hooks onto a safety rope passing out of the abseil device and allows themselves to fall. The rope is pulled substantially without slip through the abseil device. Here, the arrangement of the first and second centrifugal clutches ensures a constant and relatively low abseiling speed, such that the person to be abseiled does not land heavily when they reach the ground, and therefore does not suffer any injuries.

The abseil device also comprises the following components: two clamping pins 164 which extend axially through the second centrifugal weights 148 and to which the second tensile springs 150 are fastened, first clamping pins 166 which extend through the first centrifugal weights 144 and to which the first tensile springs 142 are fastened, and hexagonal socket head screws 170 which connect the rotor 110 and the covers 138, 140 to one another in a rotationally conjoint manner.

As a result of the design of the abseil device according to the invention as per FIGS. 13 to 16 with the second centrifugal clutch, it is possible to dispense with a gearing in the abseil device, wherein at the same time high braking values can be attained even at low rotational speeds. A rope pulley 136 or rope disk transmits a movement of the safety rope as a rotation to the shaft 111 and therefore to the second centrifugal weights 148 of the second centrifugal clutch 134. The rope pulley 136 has two drivers 152 which abut against at least one centrifugal weight 148 of the second brake device 134, such that positive engagement is produced between the centrifugal weight 148 and the rope pulley 136. The two drivers 152 axially engage into intermediate spaces between the two centrifugal weights 148 of the second brake device 134. The second centrifugal weights 148 slide against the eccentrically shaped rotor 110. If the rotor 110 in the center were to come to a halt, the second centrifugal weights 148 would clamp and come to a halt. The rotor 110 is therefore mounted so as to be rotatable and so as to engage non-positively with the first centrifugal brake 132, and co-rotates. If, owing to the rotational speed of the shaft 111, the first centrifugal weights 144 of the first centrifugal clutch 132 also come into engagement with the clutch wall, the rotor 110 is also braked. The second centrifugal weights 148 slide outward over the eccentric contact surface 116. As a result, the actual centrifugal brake need impart only a small braking torque, which is possible even at low rotational speeds of the rope pulley 136. The braking action of the second centrifugal brake 134 (eccentric brake) is intensified by the eccentric contact surface 116 such that a high torque is accommodated, or a connection between the second centrifugal weights 148 and the housing with a high friction force and therefore a high braking force is generated even at low rotational speeds of the rope pulley 136.

While the present invention has been particularly described, in conjunction with the specific preferred embodiment(s), it is evident that many alternatives, modifications, and variations will be apparent to those skilled in the art, in light of the foregoing description. It is therefore contemplated that the appended claims will embrace any such alternatives, modifications, and variations as falling within the true scope and spirit of the present invention. Thus, having described the invention, what is claimed is:

What is claimed is:

1. An abseil device for a safety rope comprising:
   a shaft;
   a first brake device arranged on the shaft for the safety rope, and
   a second brake device arranged on the same shaft as the first brake device;
   wherein said first brake device comprises a centrifugal clutch with a rotor and first centrifugal weights, such that said first centrifugal weights and the rotor are connected to one another in a rotationally conjoint manner;
   wherein said second brake device is designed as a centrifugal clutch with at least one second centrifugal weight arranged on the rotor so as to be movable relative to the rotor in a radial direction and in a circumferential direction at least counter to the direction of rotation of the rotor.

2. The abseil device of claim 1, wherein the first brake device includes an oil-hydraulic brake.

3. The abseil device of claim 1, wherein a clutch component surrounds the rotor and comprises a housing, and wherein a clutch wall is formed in the housing.

4. The abseil device of claim 1, including having the first brake device and the second brake device connected to one another in a rotationally conjoint manner.

5. The abseil device of claim 4, including the first brake device and the second brake device arranged jointly on the rotor.

6. The abseil device of claim 5, wherein the rotor is arranged so as to be rotatable with respect to the shaft and coaxially with respect to the shaft.

7. The abseil device of claim 6, including the rotor and the second brake device designed and arranged such that the safety rope and the rotor are in frictional communication.

8. The abseil device of claim 7, including a cover for said rotor which is connected thereto in a rotationally conjoint manner and which is arranged axially between the first and the second brake device such that the at least one second centrifugal weight of the second brake device is in frictional communication with the cover.

9. The abseil device of claim 1, including a rope pulley having at least one driver which abuts against at least one centrifugal weight of the second brake device, such that positive engagement is produced between the centrifugal weight and the rope pulley.

10. The abseil device of claim 9, wherein the second brake device is designed as a centrifugal clutch including the rotor being of oval cross section at its circumference in the region of contact between the rotor and at the centrifugal weight, wherein the centrifugal weight, in the first position, abuts in a region of oval contact surface in which the oval contact surface has the smallest cross section or the smallest cross-sectional length in the radial direction, and complementary centrifugal weights which, at a distance from the rotor and at both sides of the rotor, are connected to one another via two resiliently elastic elements such that the resiliently elastic elements force the centrifugal weights radially toward one another and press them against the contact surface on the rotor, such that two drivers are formed which engage axially into intermediate spaces between complementary centrifugal weights of the second brake device.

11. The abseil device of claim 9, wherein the at least one driver is formed in one piece with the rope pulley.

12. The abseil device of claim 3, including having the first brake device and the second brake device connected to one another in a rotationally conjoint manner.

13. The abseil device of claim 6, including a rope pulley having at least one driver which abuts against at least one centrifugal weight of the second brake device, such that positive engagement is produced between the centrifugal weight and the rope pulley.

* * * * *